US009420836B1

(12) United States Patent
Madden, Jr.

(10) Patent No.: US 9,420,836 B1
(45) Date of Patent: *Aug. 23, 2016

(54) ASTRONAUT GLOVES WITH FINGER EXTENSIONS

(71) Applicant: James R. Madden, Jr., Mesa, AZ (US)

(72) Inventor: James R. Madden, Jr., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/544,690

(22) Filed: Feb. 4, 2015

(51) Int. Cl.
*A41D 19/00* (2006.01)
*B64G 6/00* (2006.01)
*A41D 19/015* (2006.01)

(52) U.S. Cl.
CPC ......... *A41D 19/0024* (2013.01); *A41D 19/015* (2013.01); *B64G 6/00* (2013.01)

(58) Field of Classification Search
CPC .............. A41D 19/01594; A41D 19/01547; A41D 19/00; A41D 19/0024; A41D 19/015; A41D 19/01517; F41B 5/16
USPC ................ 172/371, 370, 378; 2/159; 294/25
See application file for complete search history.

(56) References Cited

U.S. PATENT DOCUMENTS

| 136,640 | A | * | 3/1873 | Bond | B61G 7/02 |
| | | | | | 2/21 |
| 183,375 | A | * | 10/1876 | Cutliff | A41D 19/01547 |
| | | | | | 172/370 |
| 381,687 | A | * | 4/1888 | Fischer | A63B 71/143 |
| | | | | | 2/19 |
| 883,761 | A | * | 4/1908 | Taylor | A61F 13/105 |
| | | | | | 112/161 |
| 1,055,838 | A | * | 3/1913 | Torrance | A41D 19/01547 |
| | | | | | 172/370 |
| 2,717,546 | A | * | 9/1955 | Ryden | A41D 19/01547 |
| | | | | | 172/370 |
| 2,954,832 | A | * | 10/1960 | Pirone Amato | A01G 1/12 |
| | | | | | 172/370 |
| D195,189 | S | * | 5/1963 | Schulte, Jr. | 340/321 |
| 3,417,840 | A | * | 12/1968 | Farnsworth, Jr. | A41D 19/01594 |
| | | | | | 182/8 |
| 3,593,803 | A | * | 7/1971 | Ibach | A01B 1/00 |
| | | | | | 172/10 |
| 4,766,612 | A | * | 8/1988 | Patton, Sr. | A41D 19/01517 |
| | | | | | 2/159 |
| 4,867,246 | A | * | 9/1989 | Kiger | A41D 19/01594 |
| | | | | | 172/370 |
| 5,644,796 | A | * | 7/1997 | Laughlin | A41D 19/01594 |
| | | | | | 2/160 |
| 5,887,283 | A | * | 3/1999 | Mackay | A01B 1/14 |
| | | | | | 172/370 |
| 6,059,694 | A | * | 5/2000 | Villepigue | A63B 21/0004 |
| | | | | | 294/25 |
| 6,557,177 | B2 | * | 5/2003 | Hochmuth | A41D 19/015 |
| | | | | | 2/159 |
| 8,955,166 | B1 | * | 2/2015 | Madden, Jr. | A41D 19/01594 |
| | | | | | 2/160 |
| 2007/0118968 | A1 | * | 5/2007 | Doty | A61H 7/003 |
| | | | | | 2/160 |
| 2009/0172864 | A1 | * | 7/2009 | Fisher | A41D 19/01588 |
| | | | | | 2/161.1 |
| 2011/0088139 | A1 | * | 4/2011 | Travell | A41D 19/01588 |
| | | | | | 2/161.1 |
| 2012/0266357 | A1 | * | 10/2012 | Nix | A63B 71/148 |
| | | | | | 2/161.1 |

* cited by examiner

*Primary Examiner* — Andrew W Collins
*Assistant Examiner* — Brieanna Szafran
(74) *Attorney, Agent, or Firm* — H. Gordon Shields

(57) ABSTRACT

Finger extensions for astronaut gloves for astronaut suits are disposed in sleeves on digits of the gloves. Different embodiments for the extensions are illustrated and discussed. The sleeves are secured to the tops of the digits. The extension elements include bases disposed in the sleeves and tips at outer ends of the bases. The tips may include pads which contact elements desired to be manipulated. The extensions are pivotal with the movement of the astronaut's digits in a glove. Only a slight movement of the astronaut's digits is required to provide the required dexterity for the astronaut user to grasp, pick up, move, etc., desired elements with the extensions. Inflexible rings about the extensions are fixed to the gloves prevent reverse bending of the extensions and maintain the extensions generally parallel to the users fingers. The extensions may be fixed or extendable and retractable, as desired. Particular designs for the extensions may depend on the desired task for the astronaut or astronauts and the elements with which the astronaut(s) will be working.

16 Claims, 6 Drawing Sheets

ASTRONAUT GLOVES WITH FINGER EXTENSIONS

CROSS REFERENCE TO RELATED APPLICATIONS

This application is a Continuation of application Ser. No. 13/815,237, Filed Feb. 12, 2013.

STATEMENT REGARDING FEDERALLY SPONSORED RESEARCH OR DEVELOPMENT

Not Applicable

BACKGROUND OF THE INVENTION

1. Field of the Invention

This invention relates to astronaut gloves for a space suit, and more particularly, to astronaut gloves with finger extensions to provide finger dexterity for astronauts while working in the hostile environment of space.

2. Description of the Prior Art

Astronaut gloves are, of necessity, very cumbersome with respect to finger dexterity. Because of the nature of the environment in which astronauts work, astronaut space suits are inherently stiff and difficult to move with any degree of ease of motion. Gloves are especially difficult to use for certain types of work required in the repair and assembly of elements in space. Moreover, the astronaut suits and gloves include tubes for heating and cooling. The many layers involved in the astronaut gloves render them very difficult to use when grasping is needed or desired to any degree of flexibility. The present invention overcomes the problems of the prior art and provides astronauts with dexterity not found in the prior art by providing finger extensions on the gloves.

Finger splints have been used for many, many years for immobilizing sprained or broken fingers. Moreover, there are types of gloves in the prior art that use elements to immobilize fingers for various reasons, such as arthritis or multiple broken or sprained fingers. Essentially, splints have been adapted to such gloves. In some cases splints may be secured to basic gloves with hook and loop fastening elements. However, such gloves are not comparable to astronaut gloves. And splints are not comparable to extensions for cumbersome astronaut gloves to enable astronauts to work in the hostile environment of space.

Gloves have also been suggested that have tips to enable gardeners to facilitate gardening functions by including fixed tips to finger elements of the gloves or to adaptations of second or outer glove elements that may be put on over flexible gardening gloves. In the latter situation, flexible elements are secured to the outer glove and extend outwardly from finger elements of the inner glove. Again, such adaptations of basic gardening gloves are not comparable to extensions for cumbersome astronaut gloves to enable astronauts to work in the hostile environment of space.

SUMMARY OF THE INVENTION

The invention described and claimed herein comprises extensions for fingers on astronaut gloves. The extensions may extendable and retractable as desired, or they may be fixed, depending on the particular application for which the gloves are to be used. Several different embodiments of finger extensions are described. The extensions provide an astronaut with the dexterity to pick up and use or adjust, etc., relatively small items.

Among the objects of the present invention are the following:

To provide new and useful astronaut gloves for an astronaut suit for use in the hostile environment of space;

To provide new and useful astronaut gloves having finger extensions for grasping an element;

To provide new and useful extendable finger extensions for astronaut gloves;

To provide new and useful finger extensions housed in sleeves on astronaut glove fingers;

To provide a new and useful astronaut glove having segmented finger extensions;

To provide new and useful finger extension sleeves secured to the top of fingers on gloves;

To provide new and useful finger extension caps secured to the tips of fingers on gloves;

To provide new and useful flexible finger extensions for gloves;

To provide new and useful astronaut gloves having finger extensions and rings for keeping the finger extensions generally parallel to the astronaut gloves' fingers;

To provide new and useful finger extensions for astronaut gloves and rings about the extensions for preventing the reverse bending of the extensions;

To provide new and useful extendable and retractable finger extensions for gloves; and To provide new and useful astronaut gloves having finger extensions with opposable elements.

DETAILED DESCRIPTION OF THE INVENTION

Figure 1:
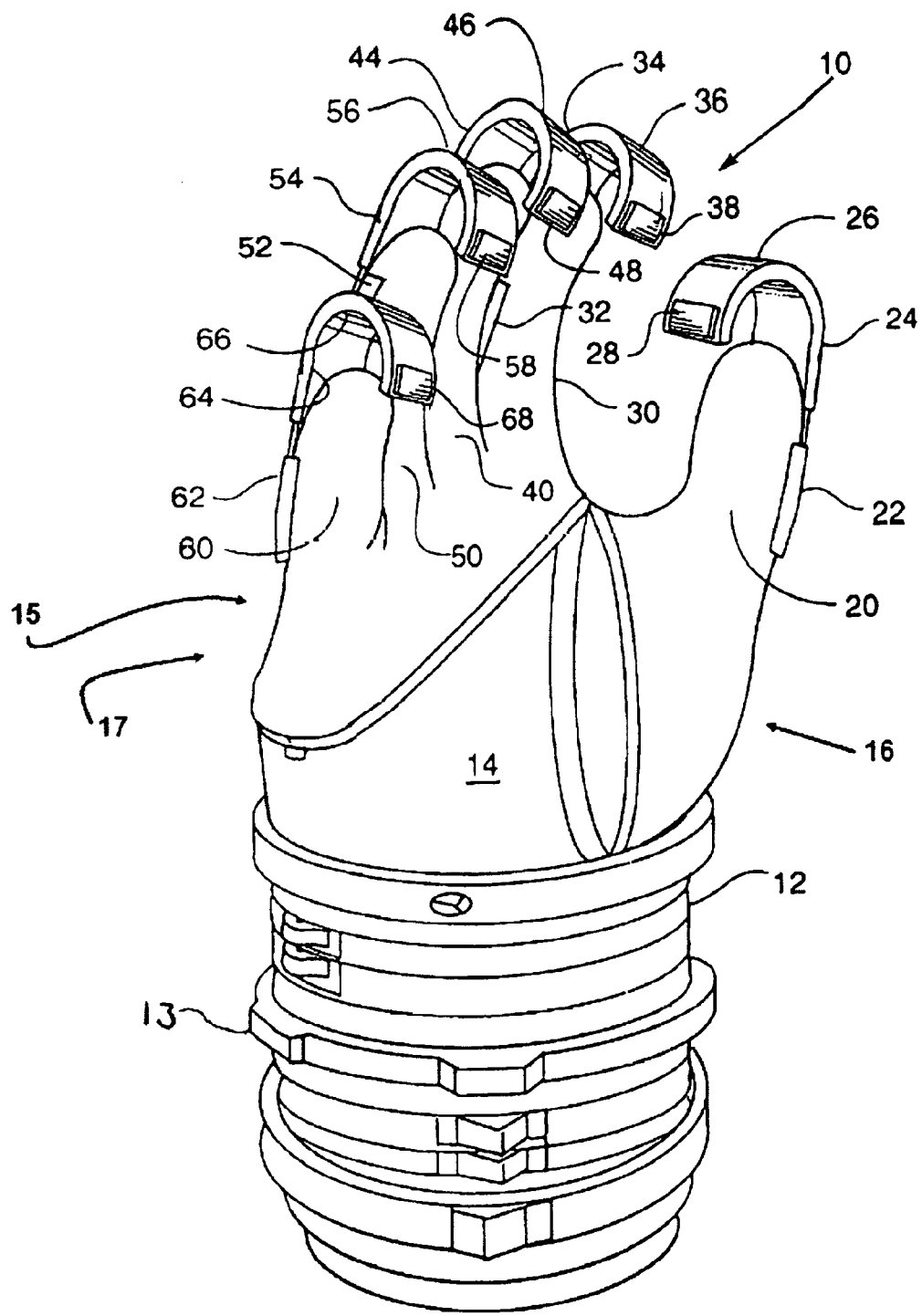
FIG. 1 is a perspective view of an astronaut glove of the present invention.

FIG. 1 is a perspective view of an astronaut glove 10 of the present invention. The glove 10 includes a cuff section or portion 12 which includes elements 13 for connecting the glove 10 to the arm portion of an astronaut pressure suit. The glove also includes a palm section or portion 14. Extending from the palm section 14 are five digit sections which receive the astronaut's digits, namely a thumb section 20, an index finger section 30, a middle finger section 40, a third finger section 50, and a little finger section 60.

For convenience, the respective digit sections will simply be referred to hereafter as "fingers." When reference is made to the thumb or fingers of an astronaut user of a glove, such reference will be made specifically to insure that there is no confusion in what is referred to, whether reference is made to a portion of a glove or to the digits of the astronaut user of the glove. For simplification, all five digit sections will generally be referred to as "fingers," unless it is necessary to refer to the thumb specifically.

Each finger section includes a pocket or sleeve in which is disposed a finger extension element. Thus, as shown in FIG. 1, the finger 20 includes a sleeve 22, the finger 30 includes a sleeve 32, the finger 50 includes a sleeve 52, and the finger 60 includes a sleeve 62. The sleeves are shown secured to the tops of the respective fingers. In each sleeve is a finger extension element, one extension for a thumb and four extensions for the index finger, the middle finger, the third finger, and the little finger, respectively. Except as specifically set forth herein, the thumb will generally be referred simply as a finger.

Five finger extensions are shown in FIG. 1, an extension 24 for the finger 20, an extension 34 for the finger 30, an extension 44 for the finger 40, an extension 54 for the finger 40, and an extension 64 for the finger 60. Each extension includes an end portion which is curved to fit around the end of each finger. The extensions are shown in FIG. 1 as being extended outwardly in their open positions, as opposed to their closed or their nested positions. In their nested positions the end portions of the extensions are disposed against the distal tips of the fingers.

The extension may be selectively extended or remain nested, or closed, as desired by the astronaut user or wearer. That is, as astronaut user may desire to only extend one or two extensions, or perhaps three, four, or five. Both the open or extended and the closed or nested orientations of the extensions are illustrated in some of the drawing figures discussed below.

The extensions include a base generally disposed in their respective sleeves and movable therein, and a tip secured to the base. The base is the proximal portion of the extension and the tip is at the distal end of the extension. Each tip includes a curved end. The curved end fits over the distal tip of the finger. At the bottom of the end is a return and on the bottom of the return may be a pad. A pad, if present, corresponds to and is aligned with the bottom of the tip of the user's finger.

It will be noted that the sleeves are shown open at their proximal end so that a base of the extensions may extend inwardly (toward the astronaut's wrist or toward the cuff section 12) beyond a sleeve if desired. On the other hand, the sleeves may be closed at their proximal ends if desired.

The extension 24 includes an end 26 and a pad 28, the extension 34 includes an end 36 and a pad 38, the extension 44 includes an end 46 and a pad 48, the extension 54 includes an end 56 and a pad 58, and the extension 64 includes an end 66 and a pad 68.

Figure 2:
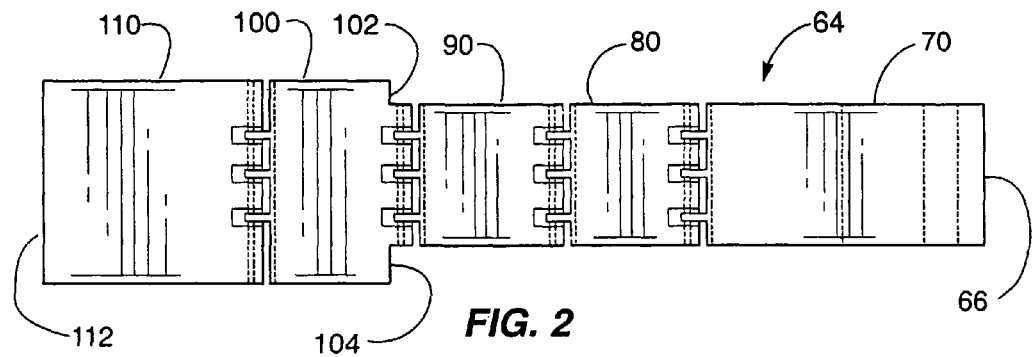
FIG. 2 is a top view of a portion of the astronaut glove of FIG. 1.
Figure 3:
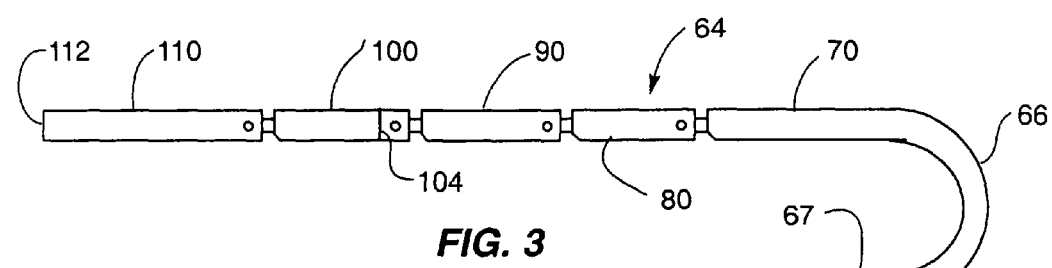
FIG. 3 is a side view of the apparatus of FIG. 2.
Figure 4:
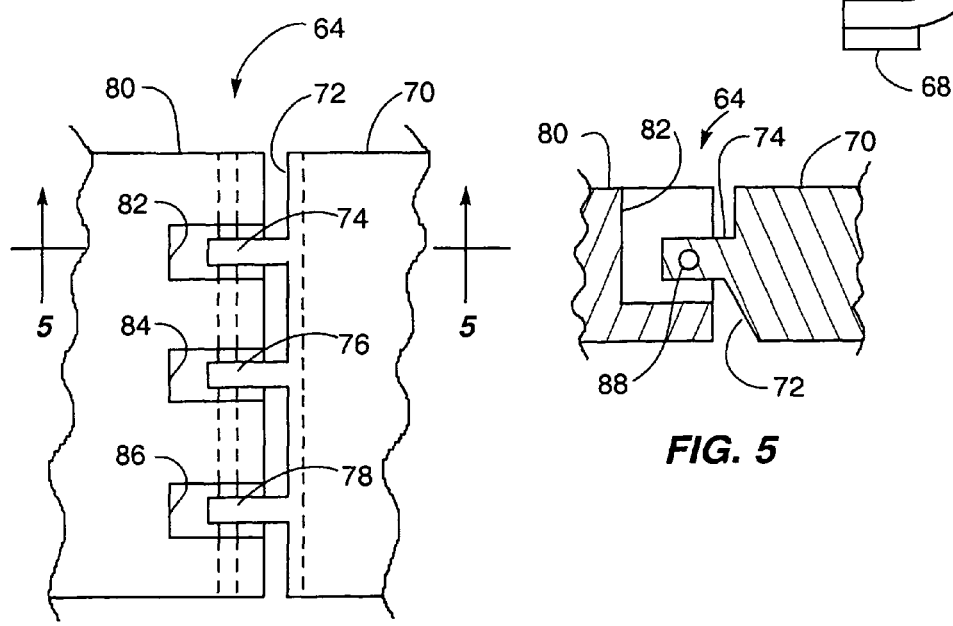
FIG. 4 is an enlarged top view of a portion of the apparatus of FIGS. 2 and 3.
Figure 5:
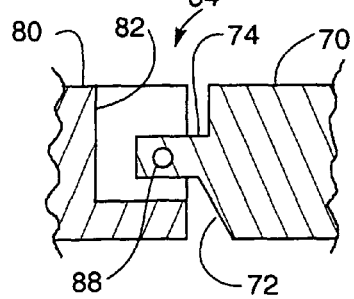
FIG. 5 is a view in partial section taken generally along line 5-5 of FIG. 4.

FIG. 2 is a top plan view of an embodiment of the extension 64. FIG. 3 is a side view of the extension 64. FIG. 4 is an enlarged top or plan view of a portion of the extension 64 and FIG. 5 is an enlarged view in partial section taken generally along line 5-5 of FIG. 4. For the following discussion, reference will be made to all of the FIGS. 2, 3, 4, and 5.

The extension 64 is shown, and it comprised a plurality of segments or links joined together. The segments or links include an end segment or link 70, a link 80, a link 90, a link 100, and a link 110. The link 70 includes the end 66 and the pad 68. The pad 68 is secured to the bottom of a return portion 67.

The links include a plurality of tongue-like projections or elements on one end, and a plurality of slots on their opposite ends which receive the tongue-like projections or elements. The link 70, comprising the distal link, includes only a plurality of tongue-like projections or elements on one end because of the end 66. The links 80, 90, 100 include tongue-like projections or elements and slots, while the link 110, comprising the proximal link, includes only slots.

The link 70 includes tongue-like projections or elements 74, 76, and 78. Extending outwardly or rearwardly from a rear end 72. As best shown in FIG. 5, the rear end 72 below the tongue-like elements 74 is chamfered to allow the link 70 to pivot downwardly relative to the link 80.

The link 80 includes slots or recesses 82, 84, and 86, which receive respectively the tongue-like projections or elements 74, 76, and 78. A pin 88 extends through aligned apertures in the tongue-like elements and links to secure the links 70 and 80 together in a pivoting relationship.

The pivoting relationship is a one way relationship because the slots extend downwardly from the top surface of each link but the slots extend downwardly only a distance sufficient to allow a limited downwardly pivoting of the adjacent link. This is best shown in FIG. 5.

The adjacent link cannot pivot upwardly beyond its original generally straight orientation aligned with the astronaut's glove and the astronaut's hand in the glove. Thus, the pivoting is essentially unidirectional. This is clearly shown in FIG. 5. The astronaut user may bend a finger downwardly and the extension 64 will bend with the finger, but the extension cannot reverse bend during use. In other words, the bending is a one way bending with the return to the normal position as nested in the sleeves.

The link 90 is substantially identical to the link 80. The link 100 is substantially identical to the links 80 and 90 in the tongue-like projection or element and slot structure, but is wider, as shown in FIG. 2, to provide offset end walls 102 and 104 to limit the outward movement or outward distance that the extension 64 may move. This will be discussed below.

The link 110 is the same width as the link 100. The link 100 includes both tongue-like projections or elements and slot elements but, as stated above, is the proximal link and thus includes a proximal end wall 112.

Each of the links 70, 80, 90, 100, and 110 include aligned apertures and pins to join together the respective links, as shown for the links 70 and 80 in FIGS. 4 and 5.

Generally, the links 80, 90, 100, and 110 may be considered as the base of the extension 64. The link 70 may be considered as the tip. The base moves in and through the sleeve 62, and the tip 70 moves outwardly from the sleeve 62 as desired by the user.

Figure 6:
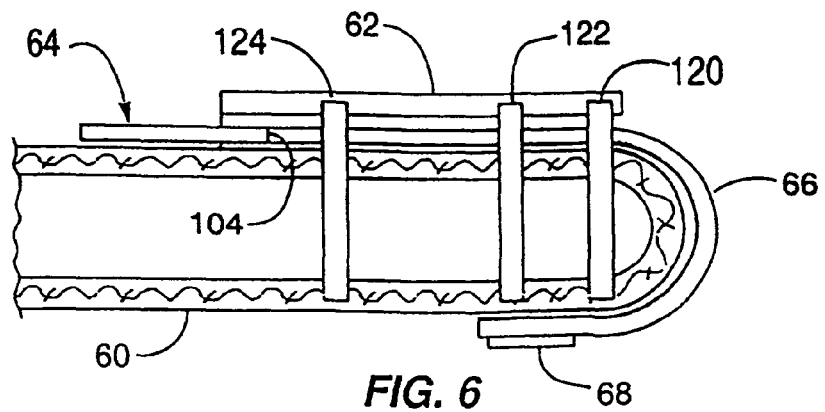
FIG. 6 is a schematic side view in partial section of a portion of the glove apparatus of FIG. 1.
Figure 7:
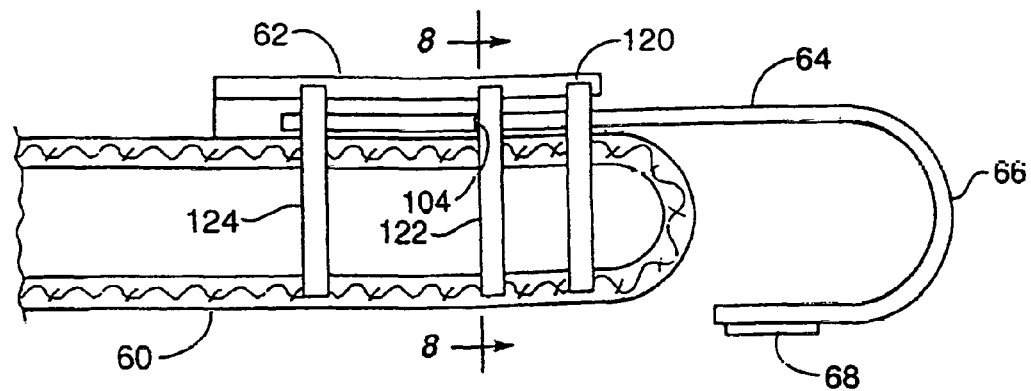
FIG. 7 is a view of the apparatus of FIG. 6 sequentially following FIG. 6.
Figure 8:
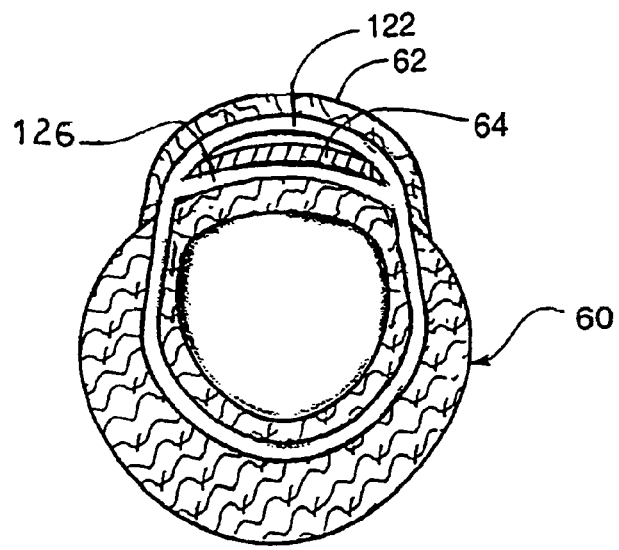
FIG. 8 is a view in partial section taken generally along line 8-8 of FIG. 7.

FIG. 6 is a side view in partial section through the finger 60, showing the extension 64 in its closed or nested position. FIG. 7 shows the extension 64 moved linearly outwardly to its outermost position, generally straight and parallel to the finger 60. FIG. 8 is a view in partial section taken generally along line 8-8 of FIG. 7. For the following discussion, reference may be made to FIGS. 6, 7, and 8, specifically, and also to FIGS. 2, 3, 4, and 5 as directed.

For convenience, the extension 64 is shown without the link structure shown in FIGS. 2, 3, 4, and 5, as discussed above. The sleeve 62 is shown appropriately secured to the top of the finger 60. Three rings 120, 122, and 124 are shown extending through the finger 60 and in the sleeve 62.

The rings are inflexible and made of appropriate material for strength. The rings need not be round, but are configured appropriately as desired to confine the extensions, as may be understood from FIG. 8.

The rings 120, 122, and 124 allows the links 70, 80, and 90, as shown in FIGS. 2, 3, 4, and 5, to move through the rings as the extension 64 is moved outwardly by the astronaut user. However, the offset end walls 102 and 104 cannot pass through the rings 122 and 124 and thus limit the outward movement of the extension 64. See FIG. 2.

Another function of the rings 120, 122, and 124 is to provide alignment for the extension 64. The rings, along with the sleeve 62, limit the sideways or lateral movement of the extension 64. Thus, the extension 64 remains substantially aligned with the finger 60.

Also, as may be understood and is obvious from FIGS. 6 and 7, the inflexible rings 120, 122, and 124 also prevent the extension 64 from reverse bending during use, as with the embodiment of FIGS. 4 and 5, as discussed above. Thus, the extension 64 remains substantially aligned generally parallel to the finger 60 as the finger 60 moves or bends in accordance with the movement of the astronaut's hand and digit (not shown) movements within the finger 60.

While the design of the links prevents the reverse bending of the extensions in normal action or movements of the astronaut's fingers, as discussed above, the inflexible rings also insure that an extension remains secured to the glove and the respective fingers and sleeves regardless of the upward force placed on an extension. This is best illustrated in FIGS. 7 and 8.

FIG. 8 shows the ring 122 disposed in the sleeve 62 and extending through the finger 60. The upper portion of the extension 64 is confined between the sleeve 62 and the finger 60. In addition to the ring 122, the extension 64 is also confined by the rings 120 and 124, and by a bridge 126 beneath the extension 64. The bridge 126 defines with the ring 120 a slot in which the extension 64 is disposed, thus insuring that the extension 64 cannot move upwardly from the generally parallel orientation of the finger 60 in response to a movement of the finger 60 by the digit (not shown) of the astronaut user. This will be discussed in more detail below.

Thus, the inflexible rings provide the structural strength to insure that an extension does not interfere with the integrity of a glove, always insuring that an extension remains generally parallel to the finger 60 and to the user's digit (not shown) within the glove's finger. In maintaining the generally parallel orientation between an extension and the finger, and thus the user's digit in the finger, not only do the rings prevent the upward bending of the extension, but they also help to protect the user's digit from being overextended upwardly regardless of the force put on an extension.

While three rings 120, 122, and 124 are illustrated, more or fewer rings may be used, as deemed appropriate. For example, it may be advantageous to have one ring for each link in an extension. Moreover, the length of a sleeve and its extension may also be as desired or as appropriate.

Figure 9:
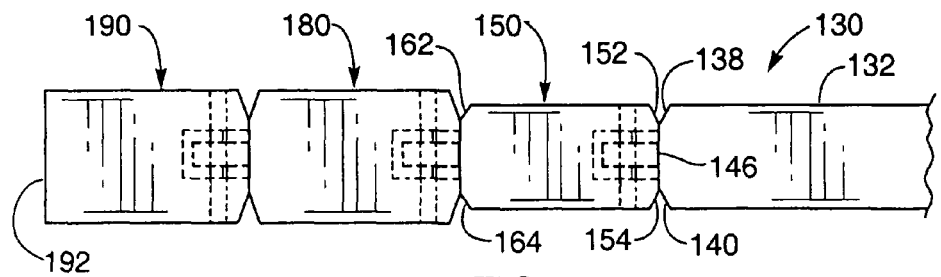
FIG. 9 is a top plan view of an alternate embodiment of a portion of a finger extension.
Figure 10:
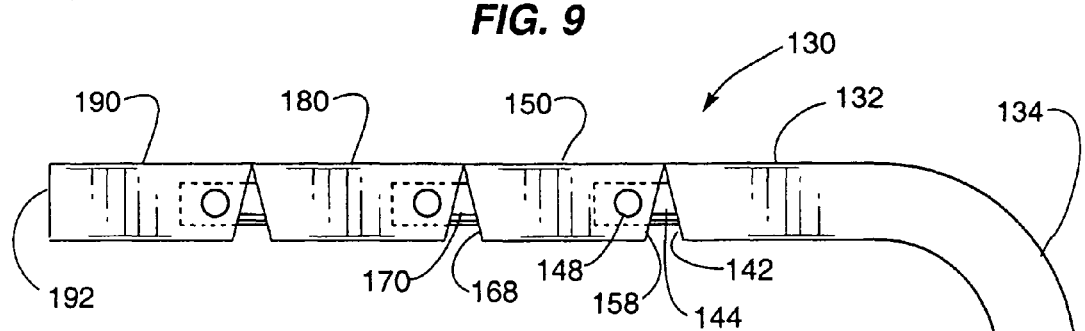
FIG. 10 is a side view of the apparatus of FIG. 9.

Another embodiment of an extension is shown in FIGS. 9, 10, 11, and 12. FIG. 9 is a top plan view a portion of an extension 130. FIG. 10 is a side view of the extension 130.

Figure 11:
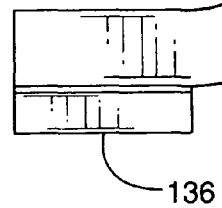
FIG. 11 is a top plan view of a portion of the apparatus of FIGS. 9 and 10.
Figure 11:
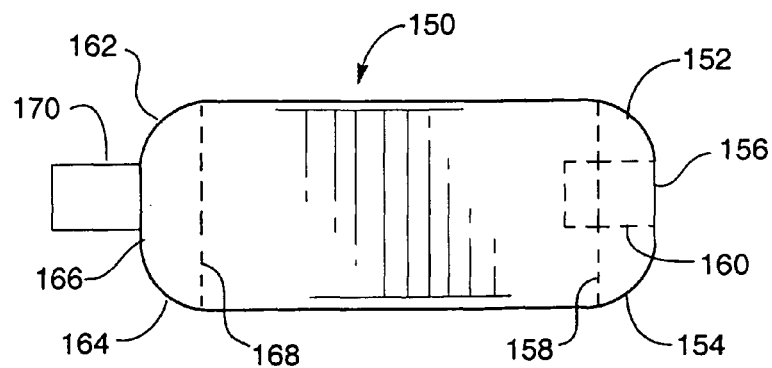
Figure 12:
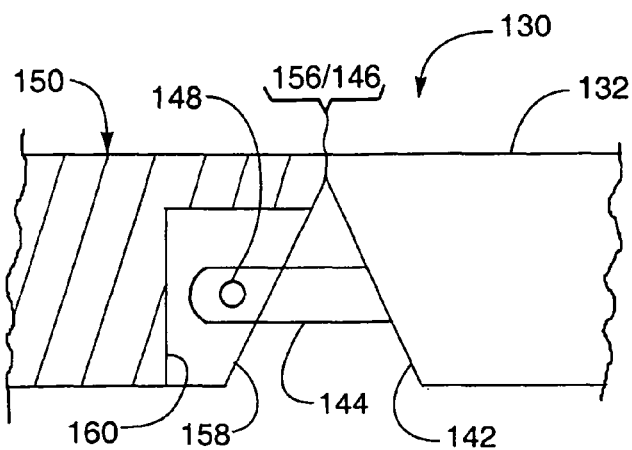
FIG. 12 is a view in partial section of a portion of the apparatus of FIGS. 9, 10, and 11.

FIG. 10 is a top plan view of a portion of the extension 130. FIG. 12 is an enlarged side view in partial section of a portion of the extension 130. For the following discussion, reference will be made to FIGS. 9, 10, 11, and 12.

The extension 130 comprises links 132, 150, 180, and 190. In FIG. 11, the link 132 is shown to include a distal curved end 134 and a bottom pad 136. The link 132 also includes a curved rear end wall portions 138 and 140, and a slanted rear end wall 142. A tongue-like projection or element 144 extends rearwardly from the slanted rear end wall 142. Above the tongue-like element 144 is a straight portion 146 of the rear end wall joining the curved portions 138 and 140.

The link 150 includes a curved front end wall portion 152, and a curved front end wall portion 154 and a straight portion 156 joining the curved portions 153 and 154. The link 150 also includes a rearwardly slanted end wall 158. The straight portion 156 abuts the straight portion 146 of the link 132.

The link 150 also includes a slot 160 which receives the tongue-like element 144 of the link 132. Aligned apertures in the tongue-like element 144 and the link 150 receive a pin 148 to pivotly secure the links 132 and 150 together.

The downward pivoting of the links 132 and 150 is limited by the slanted portions 142 and 158. As the link 132 pivots downwardly, the wall 142 will contact the wall 158 and no further pivoting may occur. Upward pivoting of the link 132 relative to the link 150 is prevented by the contact or abutment of the wall portions 146 and 158 on the links 130 and 150, respectively. Again, the pivoting of the extension 130 is a one way pivoting, with reverse bending of the link prevented by the contact or abutment of the respective wall portions.

The link 150 also includes a rounded rear end wall portion 162 and a rounded rear end wall portion 164. The rounded portions 160 and 162 are joined by a straight portion 166 which abuts a mating straight portion of the link 180. The link 150 also includes a rearwardly extending tongue-like projection or element 170. The tongue-like element 170 extends outwardly from a slanted rear wall 168.

The link 180 is substantially identical to the link 150 in general in that it includes rounded or curved portions like the curved portions 152 and 154 and curved or rounded portions 162 and 164 and straight portions like the straight portions 156 and 166 between the respective rounded or curved portions of the link 150. The link 180 also includes a slanted front wall beneath the curved and straight portions, as shown in FIG. 10. A slot extends into the slanted wall to receive the tongue-like element 170 of the link 150.

However, the width of the link 180 is greater than the width of the links 132 and 150 to limit the outward movement of the extension 130, substantially the same as discussed above for the extension 64 when the extension 130 is used with the ring structure of FIGS. 6, 7, and 8.

The link 190 has the same structure on its front end as discussed above for the links 150 and 180 to allow it to be secured to the link 180. However, since it is the proximal or rear link for the extension 130, it includes a straight rear end wall 192.

Figure 13:
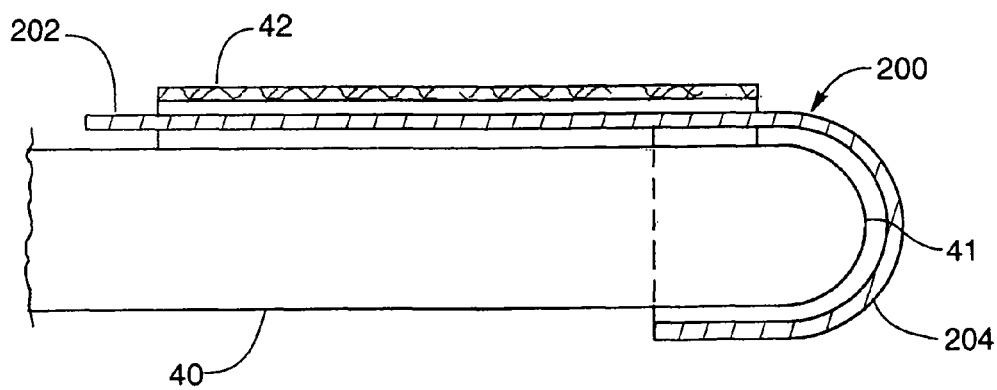
FIG. 13 is a schematic side view of another alternate embodiment of the apparatus of the present invention.

FIG. 13 is a schematic representation in partial section of the finger 40 and its sleeve 42, but with an alternate embodiment 200 of a finger extension. For purposes of simplification, rings are not shown in FIGS. 13 and 14. However, it will be understood that the discussion of rings in conjunction with the embodiments of FIGS. 6, 7, and 8, is also applicable to the extension embodiments illustrated in FIGS. 2, 3, 4, 5, 9, 10, 11, 12, and to the finger and extension embodiment of FIGS. 13 and 14, and also to the extension embodiments of FIGS. 15 and 16, and to the finger and extension embodiment of FIG. 17. Indeed, the ring structure is applicable to all of the extension embodiments illustrated in the drawing figures and discussed herein.

The finger extension 200 includes a base 202 and an end portion 204 which completely encloses a distal tip 41 of the finger 40. The end portion 204 comprises an end cap for the end 41 of the finger 40. The end cap 204 may be as long or as short as desired. The base may be segmented as discussed above in conjunction with the extensions 64 or 130, or otherwise, as discussed below.

Figure 14:
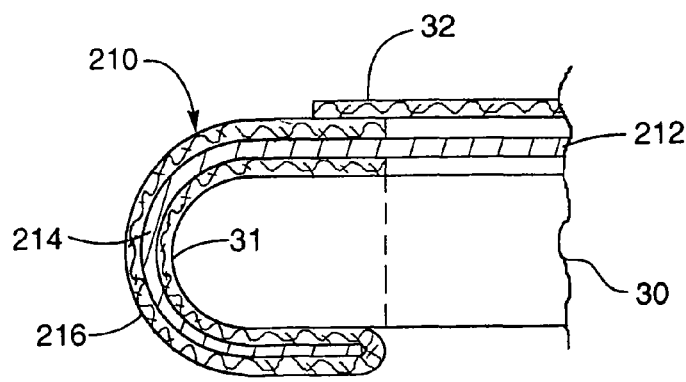
FIG. 14 is a view in partial section of another alternate embodiment of the present invention.

FIG. 14 is a schematic representation of another alternate embodiment finger extension 210 in the environment of the finger 30. The finger 30 includes a distal tip 31 and the sleeve 32.

The extension 210 includes a base portion 212 and an end cap portion 214. Covering the end cap 214 is an end cap sleeve 216. The end cap sleeve encloses the end cap 214. When the extension 210 is in its closed or nested position, as shown, the end cap 214 and its sleeve 216 essentially becomes a thicker portion of the finger 30 for the astronaut user.

Figure 15:
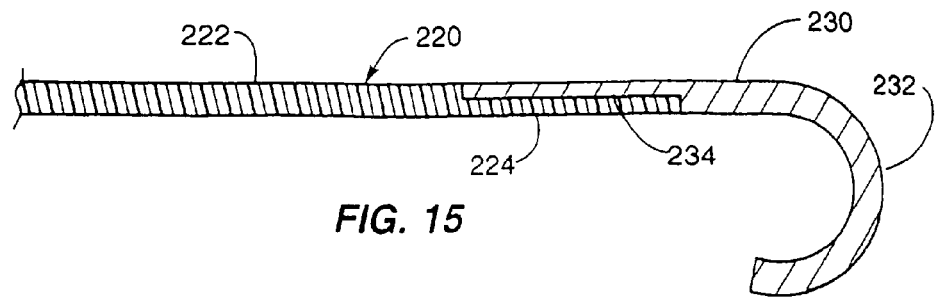
FIG. 15 is a side view in partial section of another alternate embodiment of the present invention.
Figure 16:
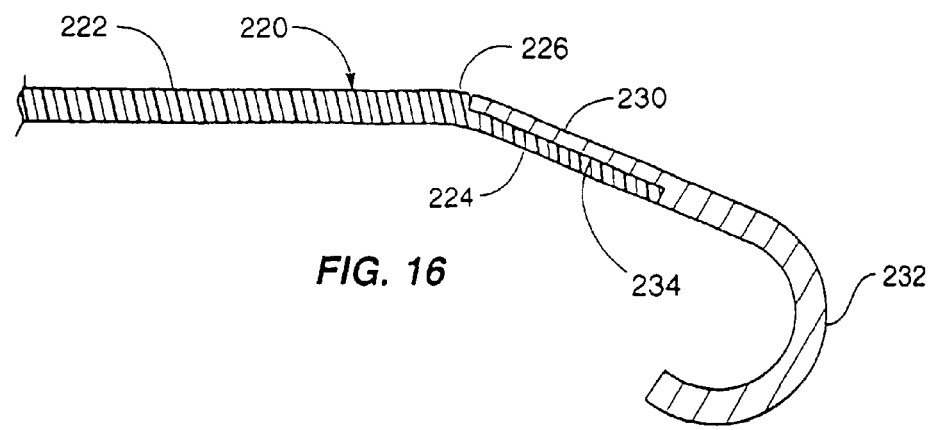
FIG. 16 is a side view of the apparatus of FIG. 15 sequentially following FIG. 15.

FIG. 15 is a side view of another alternate extension 220. FIG. 16 is a side view of the extension 220 sequentially following FIG. 15, illustrating the pivoting movement of the extension 220. For the following discussion, reference will be made to FIGS. 15 and 16.

The extension 220 includes a rear flexible portion 222 and a front rigid portion 230. The rigid portion 230 includes a curved end 232 and a bottom recess 234. The recess 234 is spaced apart rearwardly from the curved end 232. The recess receives a laminate portion 224 of the flexible portion 222. The flexible portion 224 is appropriately secured in the recess 234. As the extension 220 is moved outwardly from its sleeve, not shown, the rigid end 230 may bend as at 226. The bending of the extension 220 may be limited in its outward movement from its sleeve. Again, the use of rings as discussed above, and a widened portion of the flexible portion to abut a limiting ring, may limit the outward movement of the extension 220.

While the flexible portion 222 is shown as comprising an elastomeric material, it will be noted that any appropriate flexible material may be used. Such material must be flexible in the confines of outer space.

The curved end 232 is dimensioned to fit over the tip or end of a finger in its inner or nested position, as illustrated and discussed above in conjunction with other embodiments.

The curved end 232 is shown without a pad, and likewise the curved ends or caps 204 and 214, discussed above in conjunction with FIGS. 13 and 14, are shown without pads. It will be noted that the pads are located beneath the tips of the astronaut's fingers for usage.

The extension elements essentially become extensions of the astronaut's fingers. They may be dimensioned as appropriate, and the extension elements for each finger need not be the same length.

If desired, the end portion for the thumb digit, such as the finger 20, may be wider than a single digit as shown so that the user may grasp an element with the thumb and more than one finger, such as between the thumb and index and middle fingers. As may be best understood from FIG. 1, the tip of the thumb may be opposed with the index finger and the middle finger for easy grasping. As indicated, a widened thumb extension may also allow opposition with the index finger and the middle finger, or all four of the fingers, as needed or as s desired.

Figure 17:
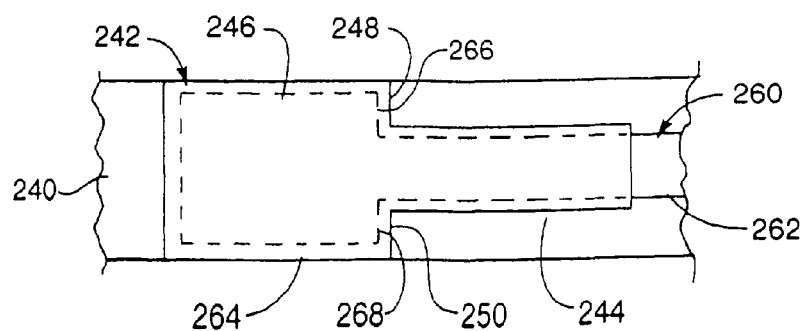
FIG. 17 is a top plan view of another alternate embodiment of the present invention.

FIG. 17 is a schematic top view of a portion of a finger 240 and a sleeve 242 secured thereto. The sleeve 242 includes a front or distal portion 244 and a rear of proximal portion 246. The rear portion 246 is wider than the front portion 244. A pair of shoulders 248 and 250 extend between the respective narrow portion 244 and the wide portion 246.

A portion of an extension 260 is shown associated with the sleeve 242. The extension 260 includes a front narrow portion 262 and a wider rear portion 264. A pair of shoulders 266 and 268 extend between the respective narrow portion 262 and the wide portion 264. The tip, not shown, extends from the narrow portion 262.

The outward movement of the extension 260 is limited by the shoulders 248, 250 and 266 and 268 of the sleeve 242 and the extension 260, respectively. In FIG. 17, the respective shoulders are shown in an abutting relationship, indicating that the extension 260 is at its outermost location.

FIG. 17 thus illustrates another method of limiting the outward movement of an extension. The inward or nesting orientation or location of the extensions is defined by the abutment of the end or tip of an extension and the tip of its finger, as shown in FIGS. 6, 13, and 14.

Returning again to FIG. 8, a bridge 126 across the ring 122 above the finger 60 and below the extension 64 provides extra strength and reinforcement for the glove. The bridge 126 essentially defines a slot in the ring 122 in which the extension moves, and provides more accurate and more precise movement of the extension. Thus, with each ring including a bridge, each extension is securely held in slots for greater accuracy or precision in the use of the extensions and extra strength and reinforcement for each finger.

It will be noted that the pads are located so as to be opposable relative to the thumb for grasping an object or element. That is, an object or element may be grasped by the thumb and an adjacent finger or fingers, with the pads aligned with the bottom of the tips of the astronaut just as if the astronaut were grasping the object or implement without the impediment of the astronaut suit and its cumbersome gloves.

It will also be noted that there is appropriate frictional engagement between the sleeves and the extensions so that a positive movement by the user is required to move the extensions relative to the sleeves. The extensions will not move unless the user astronaut positively moves them. They will not move of their own accord as the user's arms and hands move. Once in the desired position, they will remain until positively moved inwardly or outwardly by the user. If desired, of course, the extension elements may be fixed in place for particular usage.

It will be further noted that while the rings 120 are shown partially disposed within a finger of a glove, the rings may be disposed about a finger and appropriately secured to a finger if desired.

It will be further noted that the use environment of the present invention has been for astronaut gloves. However, there may be adaptations for the finger extensions for other than for astronaut gloves. The present invention is thus appropriate for any application when a user's finger dexterity is required but hampered by the glove requirements, as with astronaut gloves, deep sea dry diving suit, etc., where finger dexterity is limited by a cumbersome pressure suit of any type.

While the principles of the above described apparatus have been made clear in illustrative embodiments, without departing from those principles there may occur to those skilled in the art modifications of structure, arrangement, proportions, the elements, materials, and components used in the practice of the apparatus, and otherwise, which are particularly adapted to specific environments and operative requirements. The appended claims are intended to cover and embrace any and all such modifications within the limits only of the true spirit and scope of the present disclosure, including the use of an integral glove as part of the sleeve of a suit.

What I claim is:

1. An astronaut glove for a space suit configured for use by an astronaut in the hostile environment of space comprising in combination:
   a cuff section having elements for securing the glove to the space suit to enable the astronaut to work in the hostile environment of space;
   a palm portion at a front side of the glove configured to receive a palm side of the astronaut's hand;
   a dorsal portion at a rear side of the glove configured to receive a dorsal side of the astronaut's hand;
   a plurality of fingers including a thumb finger extending from both the palm and dorsal portions; and
   each finger of the plurality of fingers includes a distal tip and a sleeve situated on the rear side of the glove;
   wherein a finger extension is disposed within each of the sleeves,
   each said finger extension includes a base having a proximal end disposed and movable within each of the sleeves and an end portion including a distal end with a tip, the end portion is curved to fit around the distal tip of each of the plurality of fingers, the distal end of each of the end portions is disposed outside each of the sleeves extending towards or around to the front side of the glove;
   wherein each of the finger extensions are selectively movable inwardly and outwardly in each of their respective sleeves such that each of the finger extensions has an open position and a nested position,
   wherein the open position comprises wherein each of the finger extensions are extended outwardly from each of their respective sleeves,
   wherein the nested position comprises wherein the end portions of each of the finger extensions are disposed against and around the distal tip of their respective finger from the rear side to the front side of the glove; and
   the distal end of the finger extension on the thumb finger being disposed oppositely from a remainder of the distal ends of the finger extensions of the plurality of fingers for grasping an object by the astronaut; and
   wherein at least one of the finger extensions of the plurality of fingers are selectively moved outwardly to enable the astronaut to grasp an object when working in the hostile environment of space.

2. The astronaut glove of claim 1, wherein each of the bases includes a plurality of segments.

3. The astronaut glove of claim 2, in which the plurality of segments are pinned together for relative pivoting.

4. The astronaut glove of claim 3, wherein pivoting movement of the plurality of segments allows only one directional pivoting.

5. The astronaut glove of claim 1, wherein each end portion of each of the finger extensions is an end cap portion comprising an end cap sleeve, the end cap sleeve enclosing the end cap portion.

6. The astronaut glove of claim 1, in which each of the finger extensions are selectively movable outwardly relative to each of their respective sleeves for grasping an element at least between the thumb finger and another finger of the plurality of fingers, and selectively movable inwardly when not needed for grasping.

7. The astronaut glove of claim 1, which further includes means for limiting outward movement of each of the finger extensions relative to their respective sleeves.

8. The astronaut glove of claim 7, in which the means for limiting the outward movement of each of the finger extensions includes at least a single inflexible ring secured to each of the plurality of fingers and a surface on each of the finger extensions for abutting the single inflexible ring.

9. The astronaut glove of claim 7, in which the means for limiting the outward movement of each of the finger extensions includes an abutting relationship between each of the finger extensions and their respective sleeves.

10. An astronaut glove for a space suit configured for use by an astronaut in the hostile environment of space comprising:
    a palm portion at a front side of the glove configured to receive a palm side of the astronaut's hand;
    a dorsal portion at a rear side of the glove configured to receive a dorsal side of the astronaut's hand;
    a plurality of fingers including a thumb finger extending from both the palm and dorsal portions; and
    each finger of the plurality of fingers includes a distal tip and a sleeve situated on the rear side of the glove;
    wherein a finger extension is disposed within each of the sleeves,
    each said finger extension includes a base having a proximal end disposed and movable within each of the sleeves and an end portion including a distal end with a tip, the end portion is curved to fit around the distal tip of each of the plurality of fingers, the distal end of each of the end portions is disposed outside each of the sleeves extending towards or around to the front side of the glove;
    wherein each of the finger extensions are selectively movable inwardly and outwardly in each of their respective sleeves such that each of the finger extensions has an open position and a nested position,
    wherein the open position comprises wherein each of the finger extensions are extended outwardly from each of their respective sleeves,
    wherein the nested position comprises wherein the end portions of each of the finger extensions are disposed against and around the distal tip of their respective finger from the rear side to the front side of the glove; and
    the distal end of the finger extension on the thumb finger being disposed oppositely from a remainder of the distal ends of the finger extensions of the plurality of fingers for grasping an object by the astronaut; and
    wherein at least one of the finger extensions of the plurality of fingers are selectively moved outwardly to enable the astronaut to grasp an object when working in the hostile environment of space.

11. The astronaut glove of claim 10, in which the proximal end of each said finger extension is a rear flexible portion and the end portion of each said finger extension is a front rigid portion, and further wherein the end portion of each said finger extension is pivotally secured to its respective proximal end.

12. The astronaut glove of claim 10 in which each said base is segmented for pivoting movement.

13. The astronaut glove of claim 12 in which the pivoting movement is unidirectional configured to correspond with movement of the astronaut's digits.

14. The astronaut glove of claim 10, in which each said finger extension is movable outwardly from the nested position against each of the fingers to the open position linearly outwardly from each of the fingers.

15. The astronaut glove of claim 10, which includes a ring secured to each said finger of the plurality of fingers for limiting outward movement of each of the finger extensions on each said finger and for preventing reverse bending of each of the finger extensions, and further wherein each said ring includes a bridge portion beneath each of the finger extensions, and defines with each said ring a slot in which each of the finger extensions is disposed to each said finger of the plurality of fingers.

16. The astronaut glove of claim 10, which further includes a plurality of rings secured to each said finger of the plurality of fingers, and each ring of the plurality of rings includes a bridge defining with each said ring a slot in which each of the finger extensions move.

* * * * *